United States Patent
Hu et al.

(10) Patent No.: US 7,280,649 B2
(45) Date of Patent: *Oct. 9, 2007

(54) PERSONAL AUTO ATTENDANT APPARATUS AND METHOD

(75) Inventors: Gilbert Hu, Fremont, CA (US); Shirley Sun, Saratoga, CA (US)

(73) Assignee: AltiGen Communications, Inc., Fremont, CA (US)

( * ) Notice: Subject to any disclaimer, the term of this patent is extended or adjusted under 35 U.S.C. 154(b) by 326 days.

This patent is subject to a terminal disclaimer.

(21) Appl. No.: 10/880,151

(22) Filed: Jun. 28, 2004

(65) Prior Publication Data

US 2005/0053204 A1    Mar. 10, 2005

(51) Int. Cl.
*H04M 3/42* (2006.01)

(52) U.S. Cl. .............. 379/201.12; 379/70; 379/76; 379/88.25; 379/212.01; 379/214.01; 379/218.01

(58) Field of Classification Search ............ 379/70, 379/76, 88.25, 201.12, 212.01, 214.01, 218.01
See application file for complete search history.

(56) References Cited

U.S. PATENT DOCUMENTS

| 5,581,604 A | * | 12/1996 | Robinson et al. | ......... 379/88.13 |
| 5,946,386 A | * | 8/1999 | Rogers et al. | ......... 379/265.09 |
| 6,122,345 A | * | 9/2000 | Johnson | ..................... 379/67.1 |
| 6,292,549 B1 | * | 9/2001 | Lung et al. | ............ 379/142.01 |

\* cited by examiner

*Primary Examiner*—Quynh H. Nguyen
(74) *Attorney, Agent, or Firm*—Townsend and Townsend and Crew LLP; Kenneth R. Allen

(57) ABSTRACT

A method for operating a telecommunications server including configuring a personal auto attendant associated with a particular telephone extension, the personal auto attendant including a series of menu selections, each menu selection associated with a user defined action, receiving an incoming call from a caller for the particular telephone extension, transferring the incoming call to the particular telephone extension, outputting the series of menu selections to the caller, receiving a menu selection from the series of menu selections from the caller, and performing a user-defined action associated with the menu selection.

21 Claims, 4 Drawing Sheets

PERSONAL AUTO ATTENDANT APPARATUS AND METHOD

CROSS-REFERENCE TO RELATED APPLICATIONS

The present invention disclosure claims priority to U.S. patent application Ser. No. 60/139,315, filed Jun. 15, 1999. That application is herein by incorporated by reference for all purposes.

BACKGROUND OF THE INVENTION

The present invention relates to computer telephony. More specifically, the present invention relates to enhanced auto attendant methods and apparatus.

Auto attendant is a term used in the telephony industry to describe the functions of automatically processing incoming telephone calls. Most people are familiar with auto attendant functionality, for example, when calling a credit card company or a bank, callers are often greeted by an auto attendant.

The auto attendant typically presents the caller with a menu of options and instructs the caller to depress particular keys on their telephone to select those options. For example, the auto attendant may instruct the caller to press "1" for sales, "2" for customer service, "3" to enter an extension, "0" to reach a live attendant (or operator), and the like. In response to the menu, the caller typically presses a key corresponding to the option desired, and the auto attendant performs that option. For example, the auto attendant will connect the caller to a particular extension, or groups of extensions, will connect the caller to a voice mail system, and the like. Auto attendants are typically factory configured or configured by the management information systems (MIS) departments.

Menus of selections available to callers are also found in voice mail systems. As is well known, voice mail systems typically provide callers with menus and sub-menus of actions to take depending upon the caller pressing keys on their telephone. For example, a typical top-level voice mail menu structure may instruct the caller to press "1" to leave a message, "2" to review messages, "3" to change greetings and options, "O" to reach an operator, and the like. In response to the menu, the caller typically presses a key corresponding to the option desired, and the voice mail system performs that option. For example, the voice mail system will begin recording a message from the caller, the voice mail system will enter a configuration menu and list the actions provided, and the like. Similar to auto attendants, voice mail systems are typically factory configured or configured by the management information systems (MIS) departments.

A drawback to current auto attendants and voice mail systems includes that the menu selections and menu actions cannot be personalized for each telephone extension owner. As described above, typical auto attendants are only provided for incoming telephone calls, for example, when calling a company. Auto attendants have not been provided for individual telephone extension owners nor configurable by individual owners. With regards to voice mail systems, owners can record different greeting messages, however, owners of voice mail boxes cannot configure the menu of options available for callers, or the like.

Thus what is needed in the industry are methods and apparatus for providing owner configurable auto attendant functionality for individual telephone extension owners.

SUMMARY OF THE INVENTION

The present invention relates to enhanced computer telephony functionality. In particular, the present invention relates to personal auto attendant functionality.

According to an embodiment of the present invention, a method for operating a telecommunications server includes configuring a personal auto attendant associated with a particular telephone extension, the personal auto attendant including a series of menu selections, each menu selection associated with an owner defined action; receiving an incoming call from a caller for the particular telephone extension, and transferring the incoming call to the particular telephone extension. The technique also includes outputting the series of menu selections to the caller, receiving a menu selection from the series of menu selections from the caller, and performing a owner-defined action associated with the menu selection.

According to another embodiment, a computer program product for communications server including a processor includes code configured to direct the processor to receive configuration data for a personal auto attendant associated with a particular telephone extension, the personal auto attendant including a series of menu selections, each menu selection associated with a owner-defined action, code configured to direct the processor to receive an incoming call from a caller for the particular telephone extension, and code configured to direct the processor to transfer the incoming call to the particular telephone extension. Code configured to direct the processor to output the series of menu selections to the caller, code configured to direct the processor to receive a menu selection from the series of menu selections from the caller, and code configured to direct the processor to perform an owner-defined action associated with the menu selection are also included. The codes reside on a tangible media.

According to yet another embodiment, a telecommunications server including a processor includes a computer readable memory. The readable memory also includes code configured to direct the processor to receive configuration data for a personal auto attendant associated with a particular telephone extension, the personal auto attendant including a series of menu selections, each menu selection associated with an owner-defined action, code configured to direct the processor to receive an incoming call from a caller for the particular telephone extension, and code configured to direct the processor to transfer the incoming call to the particular telephone extension. Code configured to direct the processor to output the series of menu selections to the caller, code configured to direct the processor to receive a menu selection from the series of menu selections from the caller, and code configured to direct the processor to perform a owner-defined action associated with the menu selection are also included in the readable memory.

BRIEF DESCRIPTION OF THE DRAWINGS

In order to more fully understand the present invention, reference is made to the accompanying drawings. Understanding that these drawings are not to be considered limitations in the scope of the invention, the presently preferred embodiments and the presently understood best mode of the invention are described with additional detail through use of the accompanying drawings in which.

DESCRIPTION OF SPECIFIC EMBODIMENTS

System Overview

Figure 1:
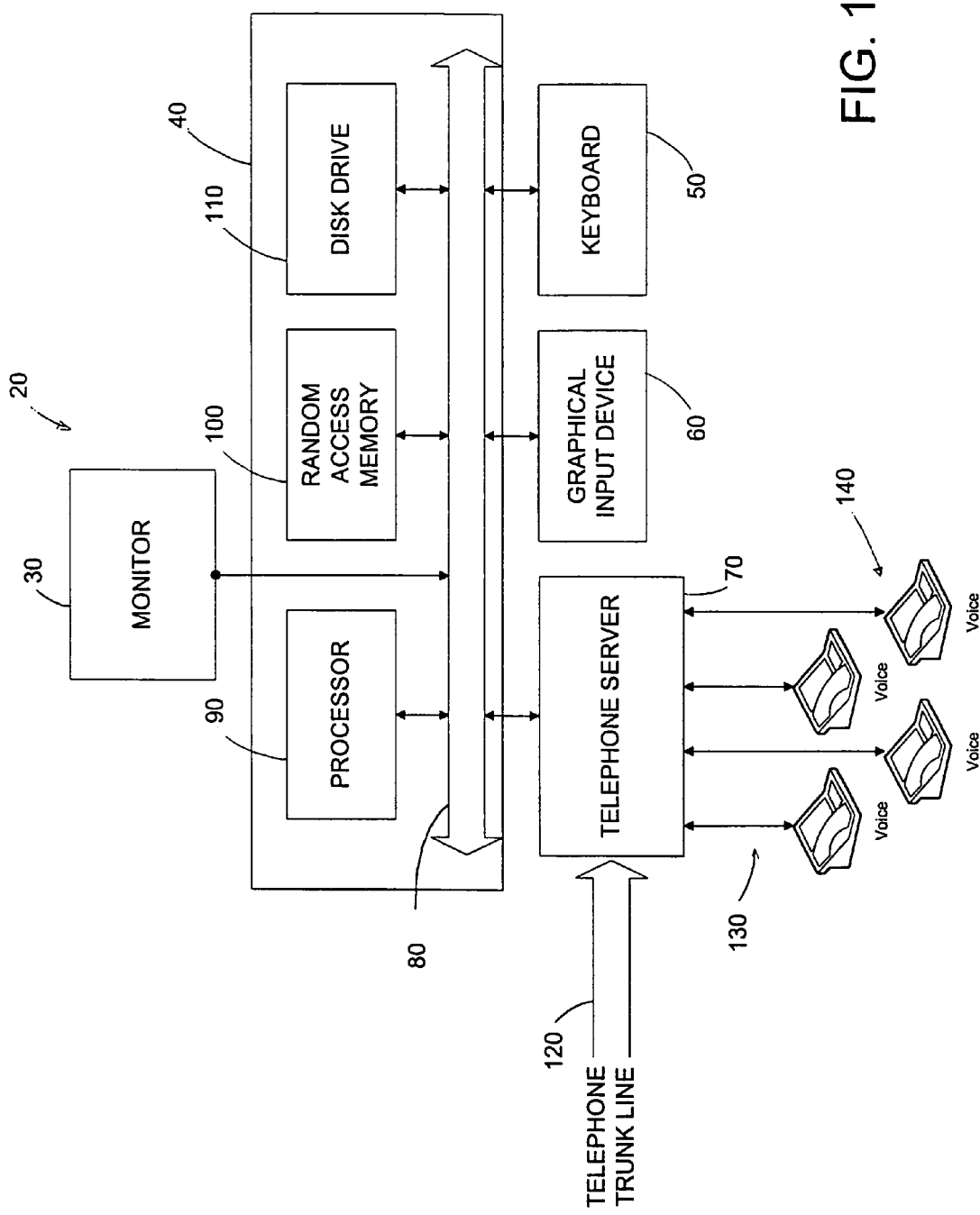
FIG. 1 is a block diagram of a computer telephony system according to a preferred embodiment of the present invention.

FIG. 1 is a block diagram of a computer telephony system 20 according to a preferred embodiment of the present invention. Computer telephony system 20 includes a monitor 30, a computer 40, a keyboard 50, a graphical input device 60, and a telephone server 70. Computer 40 includes familiar computer components such as a processor 90, and memory storage devices, such as a random access memory (RAM) 100, a disk drive 110, and a system bus 80 interconnecting the above components. A telephone trunk line 120 and individual telephone lines 130 are coupled to telephone server 70. Handsets 140, (also telephones or telephone handsets) may be coupled to individual telephone lines 130.

Handsets 140 are preferably analog signal telephone handsets, however alternatively they may be any well known type of digital or analog telephone handset. A mouse is but one example of an input device 370, also known as a pointing device. Other types of input devices may include trackballs, drawing tablets, microphones (for voice activated input), and the like. Computer telephony system 20 may be coupled to a computer network through use of a network interface, not shown, such as an Ethernet card, a modem, and the like.

RAM 100 and disk drive 110 are examples of tangible media for storage of data, message files, computer programs, drivers for the telephone server, embodiments of the herein described methods, and the like. Other types of tangible media include floppy disks, removable hard disks, optical storage media such as CD-ROMS and bar codes, and semiconductor memories such as flash memories, read-only-memories (ROMS), and battery-backed volatile memories.

In a preferred embodiment, computer telephony system 20 includes an IBM PC compatible computer having '586 or '686 class based microprocessors, such Pentium9 or PentiumII9 microprocessors from Intel Corporation. Further, in the present embodiment, computer telephony system 20 operates utilizing the WindowsNT9 operating from Microsoft Corporation, to run AltiWareOE9 software from AltiGen Communications, Inc. Telephone server 70 is preferably embodied as a Quantum9 PCI based plug-in expansion board from AltiGen Communications, Incorporated.

FIG. 1 is representative of but one type of system for embodying the present invention. It will be readily apparent to one of ordinary skill in the art that many system types of hardware and software configurations are suitable for use in conjunction with the present invention. For example, any computer communications bus may be used with alternative embodiments of the present invention, further computer telephony system 20 may operate under the LINUX operating system, may be ported onto a PowerPC G3 or G4 class microprocessor computer running MAC OS 8.5 from Apple Computer Corporation, and the like.

Hardware Description

Figure 2:
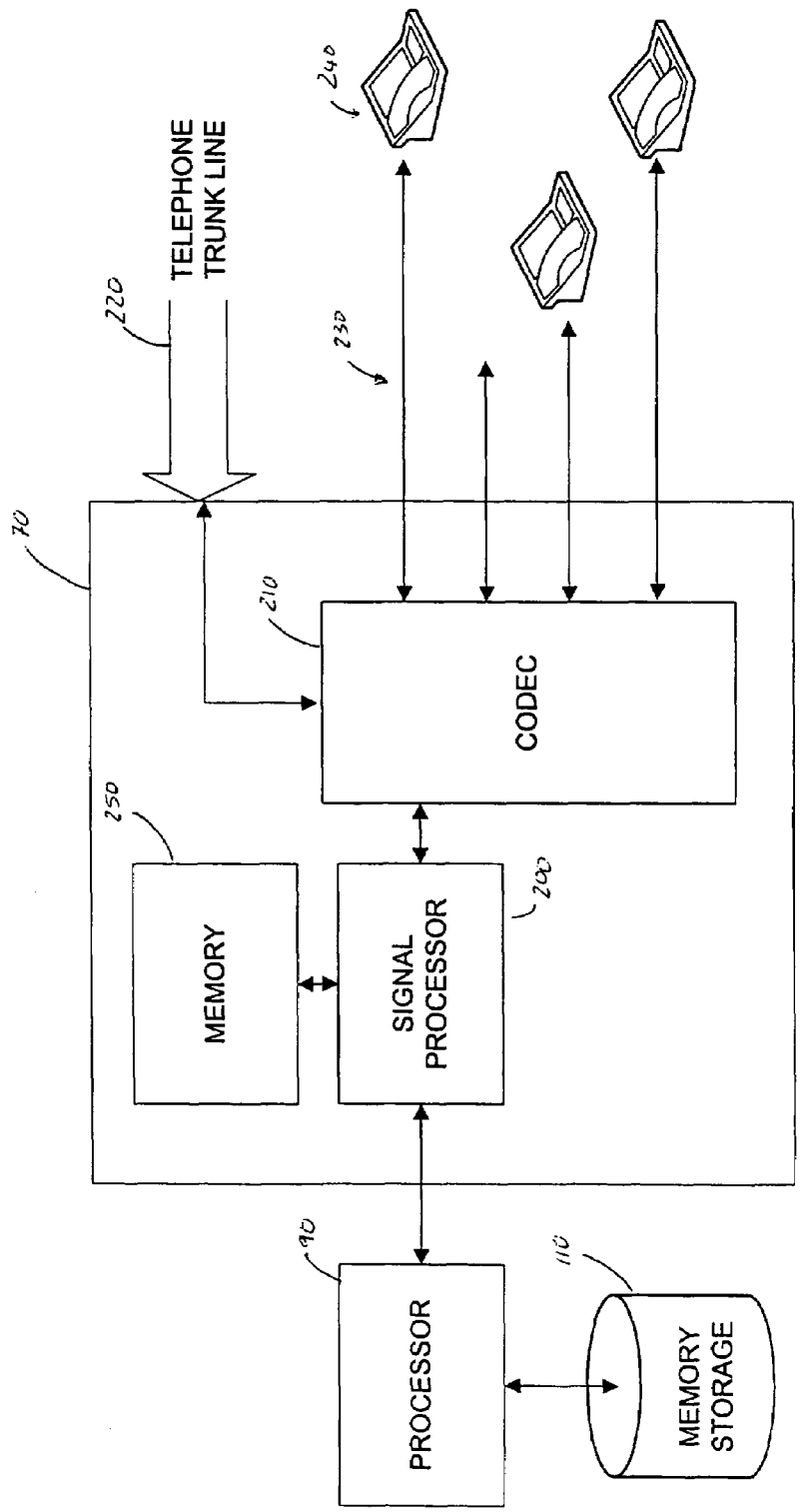
FIG. 2 is a more detailed block diagram of a portion of a computer telephony system according to an embodiment of the present invention.

FIG. 2 is a more detailed block diagram of a portion of a messaging system according to an embodiment of the present invention. FIG. 2 illustrates processor 90, disk drive 110, and telephone server 70. In the present embodiment, telephone server 70 includes a signal processor 200, a digital to analog and analog to digital coder (CODEC) 210, and a memory 250. Telephone server 70 interfaces with telephone trunk lines 220 and with telephone extension lines 230. In turn, telephone extension lines 230 are coupled to telephone handsets 240.

In the present embodiment, memory storage 110 is used to store audio messages, such as voice messages, numeric telephone numbers, caller databases, voice prompt files, and the like, as will be described later.

In FIG. 2, processor 90 is used to control the operation of telephone server 70 according to instructions from the AltiWare9 software previously described. In one embodiment of the present invention, AltiWare9 software, operates in a multi-threaded multi-tasking environment, where each thread monitors the status of a particular telephone extension line 230. The status of the particular telephone extension line is typically represented as a state machine in the software.

In the present embodiment, processor 90 is also used to convert incoming audio messages to message files in a storage format, and to convert message files and voice prompt files from the storage format to an output format (typically digital signals). In the present embodiment, two specific storage formats could be used for audio messages and include the well-known ".wav" file format, and a pulse coded modulation scheme (PCM).

In other embodiments of the present invention, a single storage format may be used. In other embodiments, other formats for storage of audio messages and the like are known to those of ordinary skill in the art and can be used. For example, formats such as the "RealAudio" format, MP3, and the like may be also be used in embodiments of the present invention.

Signal processor 200 is embodied as a Texas Instruments TMS320C5X digital signal processor (DSPs), and is coupled to receive instructions, data, and the like from processor 90. Memory 250 is used to store local instructions, a voice recognition algorithm, discussed below, data for signal processor 200, and the like. Of course DSPs from other manufacturers may be used in other embodiments of the present invention.

In the present embodiment, signal processor 200 provides telephone switching functionality to each telephone extension line. For example, in this embodiment, signal processor 200 is used to detect off-hook conditions, to provide tone generation, to detect and process key-pad (DTMF) tones generated from each telephone handset 240, to connect incoming telephone calls to appropriate extensions, and the like.

Signal processor 200 is also used to provide messaging functionality, such as an implementation of a voice mail system. In particular, signal processor 200 outputs instructions, caller prompts, messages, and the like, to the messaging user. Further, signal processor 200 receives function selections in the form of DTMF tones, spoken instructions, and the like from the messaging user. As discussed above, memory storage 110 may be used to store data associated with the messaging functionality, such as voice prompts, the incoming messages, outgoing messages, and the like.

Signal processor 200 is also used to provide auto attendant functionality for any number of telephone extensions. In particular, signal processor 200 outputs menus of actions, performs actions such as transferring the telephone call, and the like. Further, signal processor 200 receives function selections in the form of DTMF tones, spoken instructions, and the like from the caller of the auto attendant. In the present embodiment, the status of personal auto attendants are represented as state machines in the software. As discussed above, memory storage 110 may be used to store data associated with the personal auto attendants, such as voice prompts, the incoming messages, outgoing messages, and the like.

Signal processor 200 is also used to convert or "recognize" particular incoming audio messages and translate the messages into a computer recognizable form. For example, signal processor 200 can recognize the spoken words "three, two, one" as the numeric number "3,2,1", e.g. ASCII character equivalents. As another example, signal processor 200 can recognize the spoken word "yes" or "ok" as an affirmative response, and "no" as a negative response.

In the present embodiment, signal processor 200 can use any conventional voice recognition technique or algorithm. In alternative embodiments, other conventional voice recognition algorithms may also be used, as the voice recognition demands upon signal processor 200 are typically constrained. In embodiments destined for non-English speaking countries, voice recognition algorithms specific to the native languages may be used.

In an alternative embodiment of the present invention, processor 90 may be used to perform the voice recognition process instead of signal processor 200. In still another embodiment, the voice recognition process may be split between processor 90 and signal processor 200.

Signal processor 200 typically comprises a multi-process environment wherein each process monitors the off-hook and the messaging the status of a particular telephone extension line 230. The status of the particular telephone extension line in off-hook mode or in the messaging mode is represented as respective state machines within signal processor 200. In one embodiment of the present invention, signal processor 200 can process up to twelve telephone extension lines being simultaneously in off-hook mode or in messaging mode. In alternative embodiments, monitoring of states of a greater or fewer number of telephone extension lines 230 is contemplated.

As illustrated in FIG. 2, CODEC 210 is used to provide an interface between users on telephone extension lines 230 and signal processor 200. In the present embodiment, CODEC 210 digitizes analog messages and analog signals from users on telephone extension lines 230. CODEC 210 also converts digital signals from signal processor 200, processor 90, and the like, into analog signals for users on telephone extension lines 230. In the present embodiment, the analog signals include audio messages to and from users, dial tone and multifunction (DTMF) tones, and the like. The analog signals also include voice prompts or phrases that provide voice prompting capability to users on telephone extension lines 230 and messages recorded by users. Examples of voice prompts or phrases, include messages that instruct the user which keys on a telephone to select to perform particular functions, messages that tell the user how many messages are pending, requests for instructions, requests user input, and the like.

In different embodiments, tasks of signal processor 200 may be performed by processor 90 or in tandem with processor 90.

Figure 3:
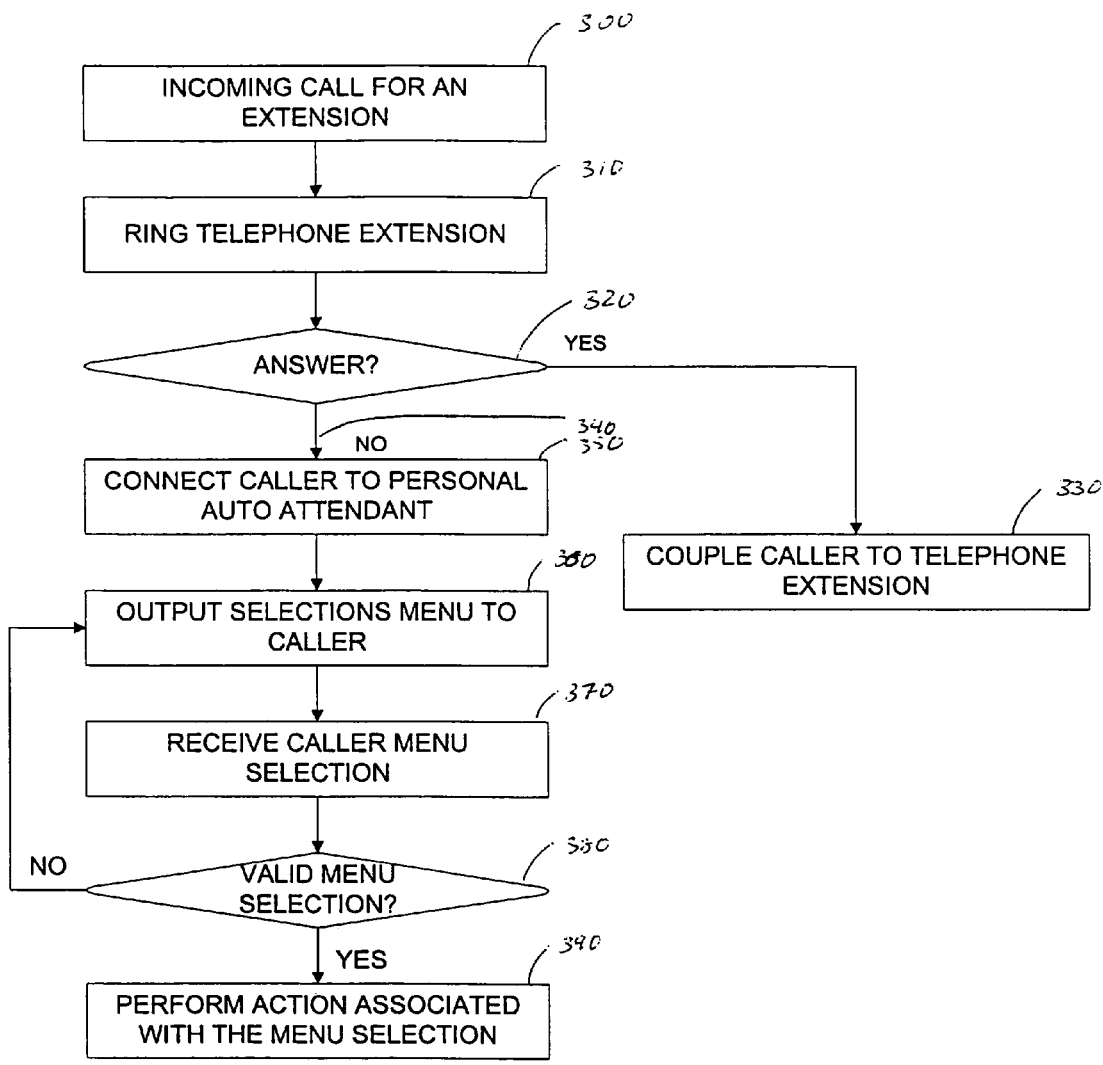
FIG. 3 illustrates a flow diagram of an embodiment of the present invention.

FIG. 3 illustrates a flowchart of an embodiment of the present invention.

Initially an incoming telephone call arrives for a particular telephone extension line, step 300. The incoming call is typically an internal telephone call from another telephone extension line 230 or an external telephone call from telephone trunk 220.

In response to the incoming telephone call, signal processor 200 sends ringing signals to the particular telephone extension, step 310. If the particular telephone extension is answered, step 320, the incoming telephone call is connected to the particular extension, step 330. If the particular telephone extension is not answered within a predetermined amount of time, step 340, the incoming call is transferred to a personal auto attendant associated with the particular extension, step 350. In the present embodiment, the personal auto attendant is treated as a typical internal telephone extension line and may be set to ring at least once before the incoming call is answered. In an alternative embodiment, the incoming telephone call is directly connected to the personal auto attendant.

Initially, the personal auto attendant outputs a menu of options available to the caller, step 360. The instructions to the caller typically include options or actions, as specified by the extension owner. For example, the actions may include transferring the call to another extension, playing a specific a message, transferring to a voice mail server, forwarding the call to a group of users, collecting caller input digits, and the like.

In one embodiment of the present invention, the menu of actions represents all actions available to the caller. In alternative embodiments, not all actions available to the caller are output. For example, for privacy, and for other reasons, the owner may not want to output all available menu selections or options. In one example, one selection available, but not output may be a private message to family members, for example messages for the kids. In such a case, the owner would not want non-family members to be aware of that option.

The selections the caller must select to perform the owner-defined actions may also be owner-determined. As an example, the owner may specify that a "1" be pressed for callers to reach a voice mail server, a "2" be pressed to forward a call, a "3" be pressed for a message for a particular person, "4" be pressed to page the owner, and the like. As another example, the owner may specify that "forward" be spoken to forward a call, "game" be spoken to play a status message of a ball game, "Jeffrey" be spoken to play a message recorded for Jeffrey, and the like.

In response to the menu of options, the caller inputs a menu selection, step 370. In the present embodiment, the selection takes the form of DTMF tones in response to the caller pressing buttons on a numeric keypad. In alternative embodiments, other forms of caller input may include spoken instructions, and the like. Voice recognition techniques may be used to recognize spoken instructions.

In response to the menu selection, if the selection is a valid selection, step 380, the action associated with the menu selection is performed by the personal auto attendant, step 390. For example, as discussed above, such actions may include transferring the caller to a different telephone extension, transferring the caller to a voice mail server, paging someone, and the like. Other examples include playing recorded messages. Examples of such messages include messages for particular persons such as a messages for a spouse, orders for a particular vendor, instructions for subordinates, answers to questions, and the like. Still other examples include providing mixed-media messages sending e-mail messages, sending facsimile transmissions, running computer programs, collecting additional user input digits (representing telephone numbers, cell phone numbers, social security numbers, account numbers, passwords, and the like. After performing the associated actions, the process may return to step 360.

In one embodiment of the present invention, authentication of the caller may be required before particular options or actions are performed for the caller. Authentication may take the form of a series of keypad strokes, voice recognition techniques, matching the caller's caller-ID derived telephone number to a database entry, and the like. Other types of authentication are envisioned to one of ordinary skill in the art in light of the present invention.

Figure 4:
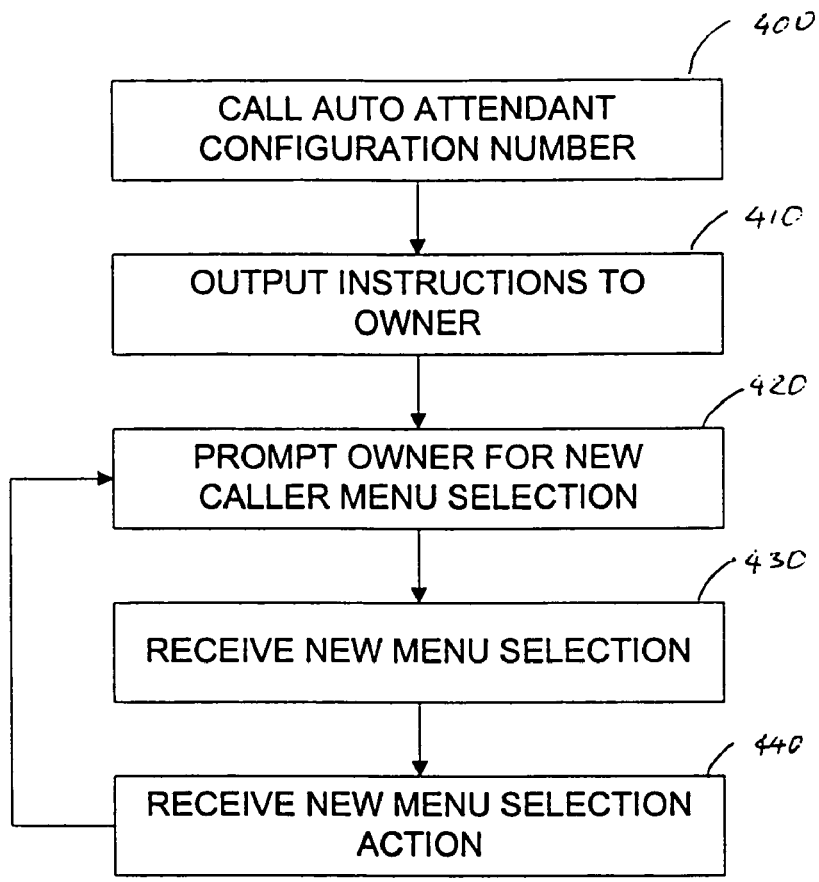
FIG. 4 illustrates a flow diagram of another embodiment of the present invention.

FIG. 4 illustrates a flowchart of another embodiment of the present invention. In particular, FIG. 4 illustrates an owner of a particular telephone extension initializing their private auto attendant.

Initially the owner calls a telephone number associated with private auto attendant configuration, step 400. The call may be an internal telephone call, an external telephone call, an internet-based telephone call, or the like. In one embodiment, the owner may simply press a series of keys in order to configure the private auto attendant. For example, the owner may press "##6", "** 16", "#99", "*515", or the like. In the present embodiment, the owner is coupled to the auto attendant state machine enabling the owner to configure the auto attendant.

Initially, the personal auto attendant outputs instructions to the owner, step 410, and typically prompts to the owner to enter a new caller option, step 420. Instructions to the caller typically include how to enter a new caller option, how to review current caller options, how to change caller option, and the like.

The owner first defines a menu selection, step 430. For example, the owner may select a menu selection of a keystroke such as "1", a series of keystrokes, a spoken phrase, and the like. Next, the owner defines an action to take, step 440. For example, the action may be to dial a number such as for forwarding a call, for ringing a pager, for transferring to a voice mail server, and the like; the action may be to play a message such as for current order status, for personal messages, and the like. These steps may be repeated to enable the owner to fully define the option menu.

In an alternative embodiment, the owner may be constrained as to menu selections and actions taken. For example, the owner may have only "1" through "9" available as menu items, where "1"-"7" are for messages, and "8"-"9" are for telephone numbers.

In yet another embodiment, the owner may configure the auto attendant functionality via a web-based graphical user interface, a Windows-based graphical user interface, or the like. In some embodiments, the voice phrases may included speech from the owner that is captured via a multi-media computer, a telephone handset, or the like. In some embodiments, the system administrator may also configure the auto attendant.

CONCLUSION

In the foregoing specification, the invention has been described with reference to specific exemplary embodiments thereof. Many changes or modifications are readily envisioned. For example, the number of menu items available may vary. Each personal auto attendant may have twenty menu items, for example. The selection of number of menu items is typically based upon MIS preference.

Other embodiments of the present invention may include combinations, sub-combinations, and or additions to the above disclosed embodiment. As an example, in embodiments utilizing voice recognition techniques, the voice recognition algorithm may be embodied for operation within processor 90, within signal processor 200, or split between the processors.

The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for operating a telecommunications system comprising:

outputting a plurality of configuration instructions to a user associated with a telephone extension from a plurality of telephone extensions coupled to the telecommunications system;

receiving a specification of a series of public menu selections from the user;

receiving a specification of a series of user-defined actions from the user;

associating public menu selections from the series of public menu selections with user-defined actions from the series of user-defined actions;

receiving a specification of a hidden menu selection from the user;

receiving a specification of a user-defined action from the user;

associating the hidden menu selection with the user-defined action;

wherein menu selections are output to incoming callers to the telephone extension, and wherein the outputted menu selections include the series of public menu selections but do not display to incoming callers the hidden menu selection associated with the user-defined actions.

2. The method of claim 1 further comprising:

receiving an incoming call from a caller for the telephone extension;

transferring the incoming call to the telephone extension, and outputting the series of public menu selections to the incoming caller.

3. The method of claim 2 further comprising:

receiving a menu selection from the incoming caller, wherein the menu selection corresponds to the hidden menu selection, and performing the user-defined action associated with the hidden menu selection.

4. The method of claim 3 further comprising:

determining whether the incoming caller is authorized to perform the user-defined action associated with the hidden menu selection, and wherein performing the user-defined action associated with the hidden menu selection comprises performing the user-defined action associated with the hidden menu selection when the incoming caller is authorized.

5. The method of claim 1 further comprising:

receiving a request to configure a auto-attendant associated with the user associated with the telephone extension;

wherein the plurality of configuration instructions comprise a plurality of auto-attendant configuration instructions, and wherein outputting the plurality of configuration instructions comprise outputting the plurality of auto-attendant configuration instructions to the user in response to the request.

6. The method of claim 1 wherein a public menu selection is selected from the group consisting of: keystroke, series of keystrokes, spoken phrase, DTMF keystroke.

7. The method of claim 1 wherein a user-defined action is selected from the group consisting of: dialing a number, ringing a pager, transferring to voice mail, playing a message, providing a mixed-media message, sending an e-mail message, sending a facsimile transmission, running a computer program, collecting user data.

8. The method of claim 1 wherein the specification of the series of public menu selections from the user are entered via a device selected from the group consisting of: telephone, computer.

9. A telecommunications system coupled to a plurality of telephones comprising:
 a memory configured to store a plurality of configuration instructions, configured to store a plurality of menu selections, and configured to store a plurality of actions, and
 a processing device coupled to the memory, wherein the processing device is configured to output the plurality of configuration instructions to a user associated with a telephone from the plurality of telephones, wherein the processing device is configured to receive a specification of a series of public menu selections from plurality of menu selections from the user, wherein the processing device is configured to receive a specification of a series of actions from the plurality of actions from the user, wherein the processing device is configured to associate public menu selections from the series of public menu selections with actions from the series of actions in response to an association provided from the user, wherein the processing device is configured to receive a specification of a hidden menu selection from the plurality of menu selections from the user, wherein the processing device is configured to receive a specification of an action from the plurality of actions from the user, and wherein the processing device is configured to associate the hidden menu selection with the action in response to an association provided from the user.

10. The telecommunication system of claim 9 wherein the processing device is also configured to output the series of public menu selections but not the hidden menu selection to incoming callers to the telephone.

11. The telecommunications system of claim 9 wherein the processing device is configured to receive a menu selection from the incoming caller, wherein the menu selection corresponds to the hidden menu selection, and where the processing device is configured to perform the action associated with the hidden menu selection in response to the hidden menu selection.

12. The telecommunications system of claim 11 wherein the processing device is also configured to determine whether the incoming caller is authorized to select the hidden menu selection, and wherein the processor is configured to perform the action associated with the hidden menu selection when the incoming caller is authorized.

13. The telecommunications system of claim 11 wherein a public menu selection is selected from the group consisting of: keystroke, series of keystrokes, spoken phrase, DTMF keystroke.

14. The telecommunications system of claim 11 wherein an action is selected from the group consisting of:
 dialing a number, ringing a pager,
 transferring a call to voice mail,
 playing a message,
 providing a mixed-media message,
 sending an e-mail message,
 sending a facsimile transmission,
 running a computer program, and
 collecting user data.

15. The telecommunications system of claim 9 further comprising a user interface device coupled to the processing device, wherein the user interface device is configured to transmit data to the user and receive data from the user, wherein the user interface device is selected from the group consisting of: telephone, computer display.

16. A computer program product for a computer system including a processor and coupled to a plurality of telephones comprising:
 code that directs the processor to output a plurality of configuration instructions to a user associated with a telephone from the plurality of telephones;
 code that directs the processor to receiving a specification of a public menu selections from a plurality of menu selections from the user;
 code that directs the processor to receiving a specification of a first action from a series of actions from the user;
 code that directs the processor to associate the public menu selection with the first action;
 code that directs the processor to receive a specification of a hidden menu selection from the plurality of menu selections from the user;
 code that directs the processor to receive a specification of a second action from the series of actions from the user;
 code that directs the processor to associate the hidden menu selection with the second action, and
 wherein the codes reside on a tangible media.

17. The computer program product of claim 16 further comprising:
 code that directs the processor to receive an incoming call from a caller for the telephone, and
 code that directs the processor to output the public menu selection to the incoming caller.

18. The computer program product of claim 17 further comprising:
 code that directs the processor to receive a menu selection from the incoming caller, wherein the menu selection corresponds to the hidden menu selection, and
 code that directs the processor to perform the second action in response to the menu selection.

19. The computer program product of claim 16 wherein the public menu selection is selected from the group consisting of: keystroke, series of keystrokes, spoken phrase, DTMF keystroke.

20. The computer program product of claim 16 wherein the second action is selected from the group consisting of: dialing a number, ringing a pager, transferring to voice mail, playing a message, providing a mixed-media message, sending an e-mail message, sending a facsimile transmission, running a computer program, collecting user data.

21. The computer program product of claim 16 wherein the hidden menu selection from the user is entered via a device selected from the group consisting of: telephone, computer.

* * * * *